(12) United States Patent
Konno

(10) Patent No.: US 6,517,305 B1
(45) Date of Patent: Feb. 11, 2003

(54) ACCESSOR DEVICE FOR TAPE LIBRARY

(75) Inventor: Tamio Konno, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/504,585

(22) Filed: Feb. 15, 2000

(30) Foreign Application Priority Data

Mar. 18, 1999 (JP) .......................................... 11-074512

(51) Int. Cl.[7] .................................................. B65G 1/04
(52) U.S. Cl. ........................ 414/281; 360/92; 414/277; 414/282; 369/34
(58) Field of Search ............................ 360/92; 414/277, 414/281, 282, 283, 751.1, 222.08, 752.1, 222.13, 753.1, 222.01; 369/34

(56) References Cited

U.S. PATENT DOCUMENTS 3,993,202 A * 11/1976 Neitzel ........................ 414/282
4,573,856 A * 3/1986 Meyer et al. ............ 212/319 X
4,687,110 A * 8/1987 Partanen .................. 212/319 X
4,937,690 A * 6/1990 Yamashita et al. ............. 360/92

FOREIGN PATENT DOCUMENTS

JP 7-085553 3/1995
JP 8-221866 8/1996

* cited by examiner

*Primary Examiner*—Frank E. Werner
(74) *Attorney, Agent, or Firm*—Foley & Lardner

(57) ABSTRACT

An accessor device for a tape library has two accessor bases movably mounted on two parallel guide rails extending along a plurality of cells housing tapes. The accessor bases have, on respective confronting portions thereof, overlapping edges which overlap each other in a direction normal to the longitudinal direction of the guide rails when the accessor bases move toward each other. The accessor device mounted on the two parallel guide rails is prevented from falling, and the accessor devices with the overlapping edges has a wide accessible area for accessing endmost regions in the tape library.

5 Claims, 4 Drawing Sheets

ACCESSOR DEVICE FOR TAPE LIBRARY

BACKGROUND OF THE INVENTION

1. Field of the Invention

The present invention relates to a tape library having a plurality of cells containing tapes which can be accessed at any time for reading and writing data, and more particularly to an accessor device for accessing such tapes.

2. Description of the Related Art

FIG. 1 of the accompanying drawings shows a conventional tape library 51 comprising a plurality of joined housings. In FIG. 1, the tape library 51 is viewed from above with an inner mechanism being made visible. In the tape library 51, the housings 53, 56 house therein respective linearly symmetrical accessor devices 54, 57 each having a hand mechanism 55 for accessing mediums (tapes). The accessor devices 54, 57 are movable along a single guide rail 58 disposed centrally in the tape library 51 for accessing cells 52 containing mediums and a drive (not shown).

The accessor device 54 has an accessor base 54-10 in the shape of a rectangular parallelepiped, and has two rollers 54-21, 54-22 mounted on a side surface thereof and spaced from each other by a pitch i.

The accessor device 57 has an accessor base 57-10 in the shape of a rectangular parallelepiped that is in a linearly symmetrical relationship to the accessor device 54, and has two rollers 57-21, 57-22 mounted on a side surface thereof and spaced from each other by a pitch j.

The two accessor devices 54, 57 are movable bidirectionally on the guide rail 58.

In FIG. 1, the accessor devices 54, 57 are shown as retracted and stopped in the respective housings 53, 56. Cells 52-1, 52-2 are endmost cells 52 that can be accessed by the hand mechanisms 55 of the accessor devices 54, 57.

When one of the accessor devices 54, 57 suffers trouble and is unable to access the cells, operation of the tape library 51 is controlled in the same manner as with the present invention.

It is assumed that the accessor device 57 suffers trouble and is retracted and stopped. Due to the trouble, the accessor device 57 is unstable to access the cells 52 or the non-illustrated drive, and is stopped in a retracted area in the housing 56.

At this time, the other accessor device 54 moves a distance k, is spaced a distance m from the retracted and stopped accessor device 57, and accesses the cell 52-2, and completes its operation.

The conventional tape library 51 has had the following problems:

The first problem is that it is difficult to prevent the accessor devices 54, 57 from falling in the direction in which they move.

The reason for the first problem is that since the two accessor devices 54, 57 move on the single guide rail 58 with the two rollers 54-21, 54-22 (57-21, 57-22), the pitch or distance between the two rollers 54-21, 54-22 (57-21, 57-22) cannot be increased.

The second problem is that the number of cells 52 accessible by both the two accessor devices 54, 57 is small.

The reason for the second problem is that because the accessor bases 54-10, 57-10 of the accessor devices 54, 57 are in the shape of a rectangular parallelepiped and are mounted in a linearly symmetrical relationship to each other, the accessor bases 54-10, 57-10 cannot be brought closely to each other as they fail to overlap each other when moved toward each other.

SUMMARY OF THE INVENTION

It is therefore an object of the present invention to provide an accessor device which is prevented from falling and can access an increased area in a tape library.

To accomplish the above object, there is provided in accordance with the present invention an accessor device for a tape library having a plurality of cells housing mediums and two guide rails extending parallel to each other along the cells, comprising two accessor bases mounted for movement along the guide rails, and two hand mechanisms mounted respectively on the accessor bases for accessing the mediums, the accessor bases having on confronting portions thereof respective overlapping edges which can overlap each other in a direction normal to the longitudinal direction of the guide rails.

Each of the accessor bases may has a pair of first rollers held in rolling engagement with one of the guide rails, and a second roller held in rolling engagement with the other of the guide rails.

Each of the accessor bases may be substantially of a triangular shaving having a first side extending along the guide rails, a second side having an end joined to an end of the first side substantially perpendicularly to the first side, and a third side interconnecting other ends of the first and second sides, the overlapping edges comprising the respective third sides confronting each other when the accessor bases overlap each other in the direction normal to the longitudinal direction of the guide rails.

Each of the accessor bases may has a pair of first rollers mounted on the first side respective at opposite ends thereof, and a second roller disposed at a junction between the second side and the third side.

Each of the hand mechanisms may be mounted on the second side of one of the accessor bases.

The third side of each of the accessor bases may be of a crank shape.

Each of the accessor bases may has an actuating mechanism for moving each of the accessor bases, the actuating mechanism being mounted on the second side.

Each of the accessor bases may has a lifting and lowering mechanism for lifting and lowering each of the hand mechanisms, the lifting and lowering mechanism being mounted on the second side.

The accessor device according to the present invention offers two major advantages as follows:

According to the first advantage, while each of the accessor bases is of a relatively large size, the number of cells that can be accessed alternately by the two accessor bases is increased.

The reason for the first advantage is that the overlapping edge of each of the accessor bases is defined as if cut from an accessor base blank, and when the accessor bases move toward each other, the accessor bases overlap each other in the direction normal to the longitudinal direction of the guide rails. The accessor bases create an overlapping region, and hence can efficiently utilize a space for being positionable closely to each other.

According to the second advantage, the accessor device is prevented from falling.

The reason for the second advantage is that the accessor bases are mounted on the two guide rails. Two rollers, which are spaced from each other by a large pitch, on each of the accessor bases are mounted on one of the guide rails to prevent the accessor device from falling along the guide rails, and one roller on each of the accessor bases is mounted on the other guide rail to prevent the accessor device from falling across the guide rails.

The above and other objects, features, and advantages of the present invention will become apparent from the following description with reference to the accompanying drawings which illustrate an example of the present invention.

DESCRIPTION OF THE PREFERRED EMBODIMENT

An embodiment of the present invention will be described below with reference to FIGS. 2 through 4.

Figure 1:
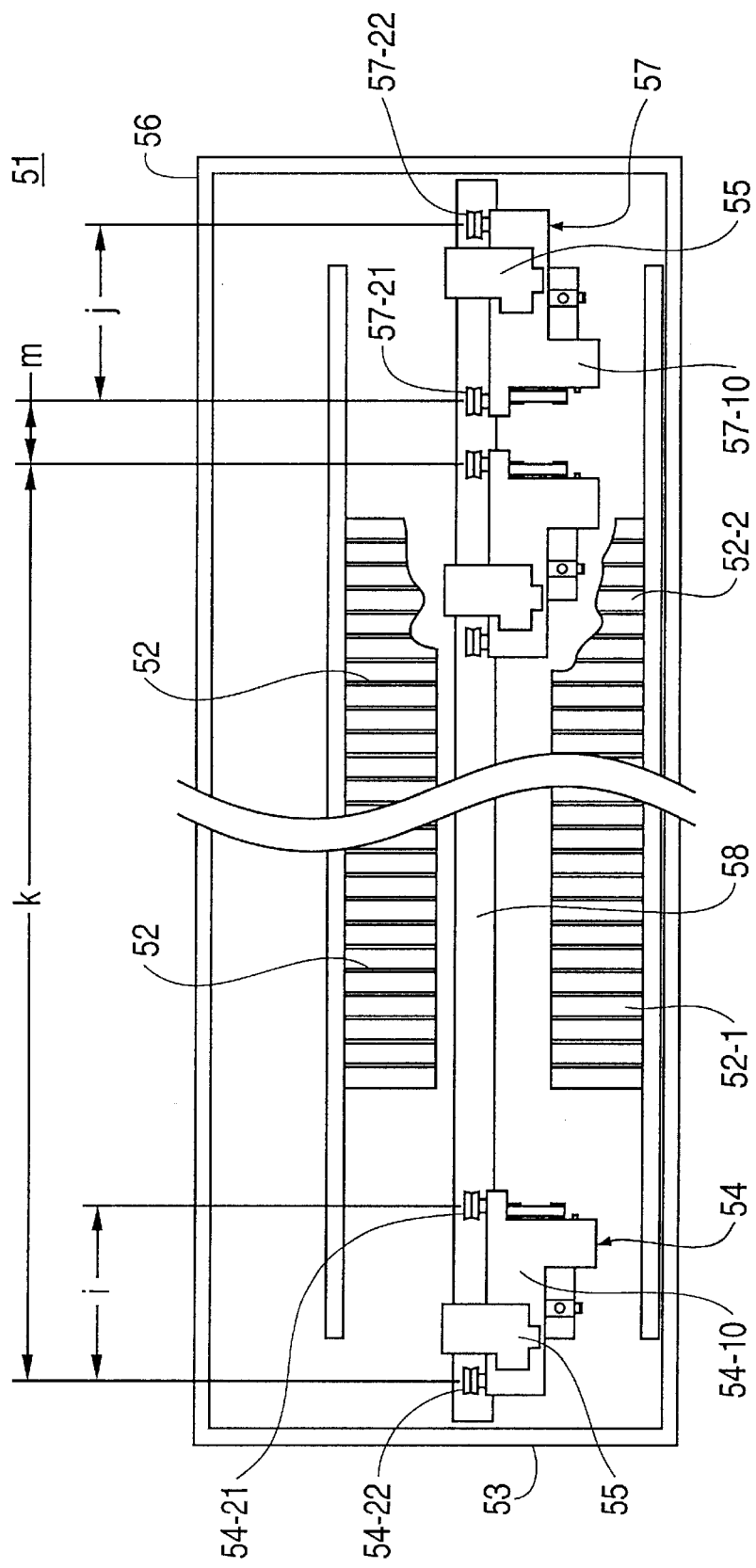
FIG. 1 is a plan view of a conventional tape library.
Figure 2:
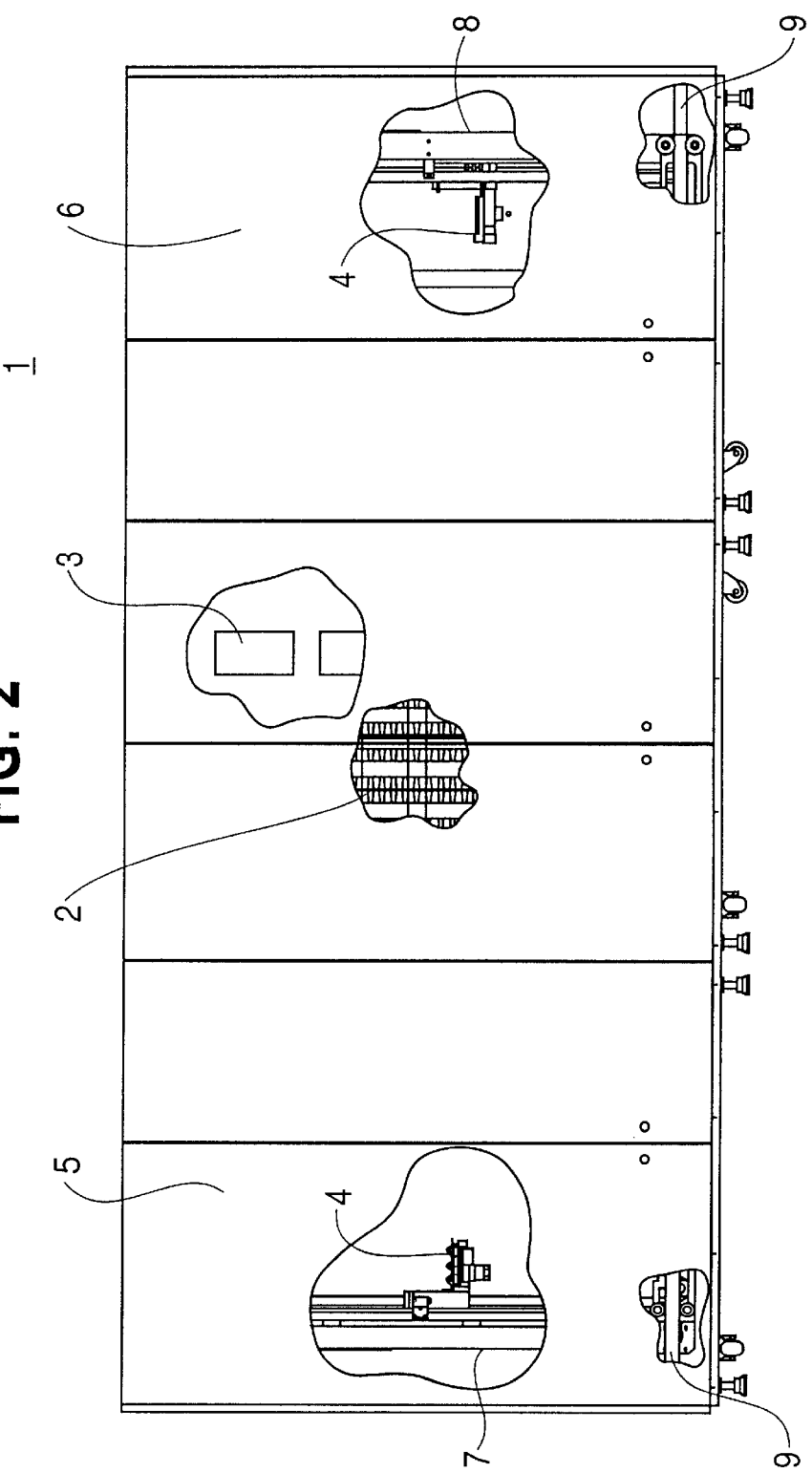
FIG. 2 a front elevational view, partly broken away, of a tape library to which the present invention is applied.

FIG. 2 shows in front elevation a tape library 1 comprising a plurality of joined housings containing mediums (tapes).

The tape library 1 comprises a plurality of cells 2 housing mediums, a plurality of drives 3 for writing data in and reading data from the mediums, and two accessors 7, 8 having respective hand mechanisms 4 for bringing mediums into and out of the cells 2 and the drives 3.

Figure 4:
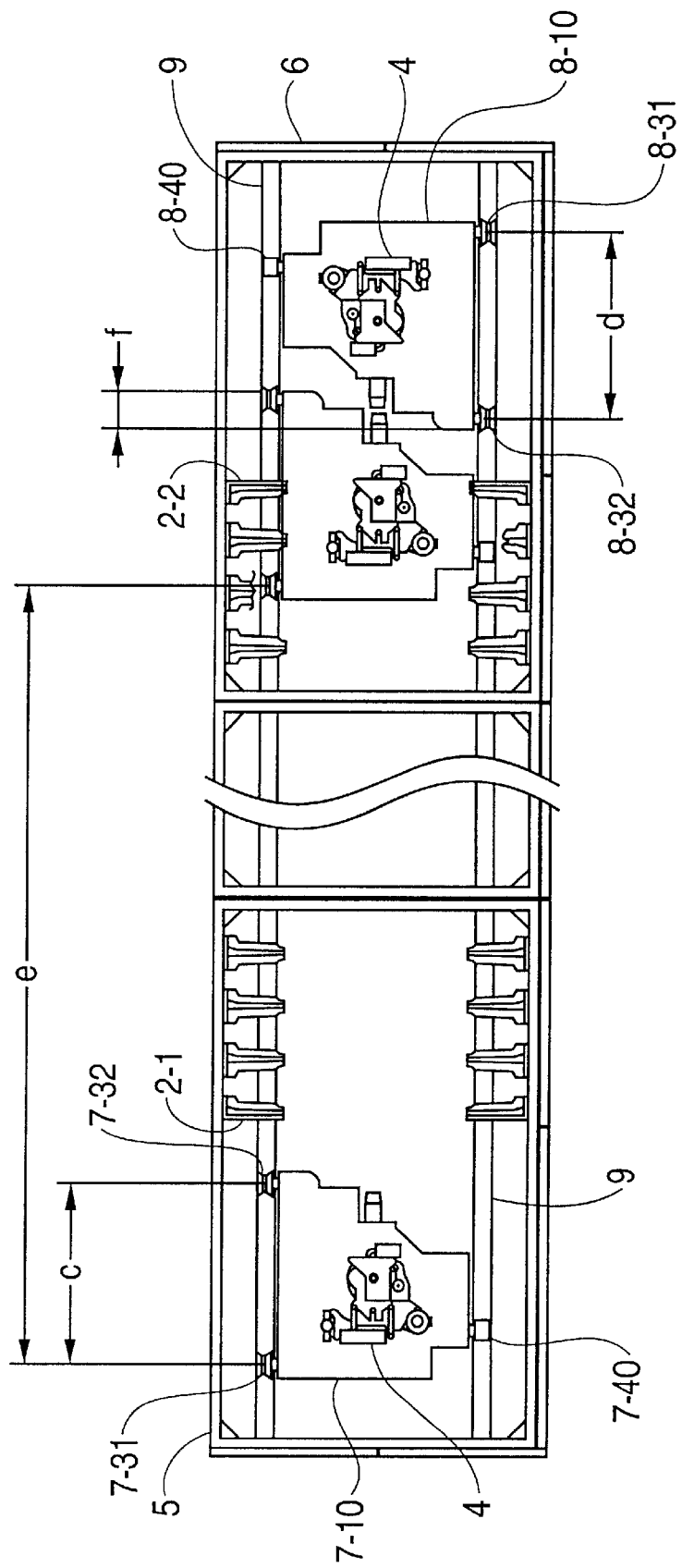
FIG. 4 is a plan view of the tape library incorporating accessor devices according to the present invention.

As shown in FIG. 4, the accessors 7, 8 are movable along two parallel guide rails 9 disposed in the joined housings 5, 6 for accessing cells 2 and the drives 3.

The accessor 7 is disposed in the housing 5 that is positioned at the left-hand end of the tape library 1, and the accessor 8 is disposed in the housing 6 that is positioned at the right-hand end of the tape library 1.

Figure 3:
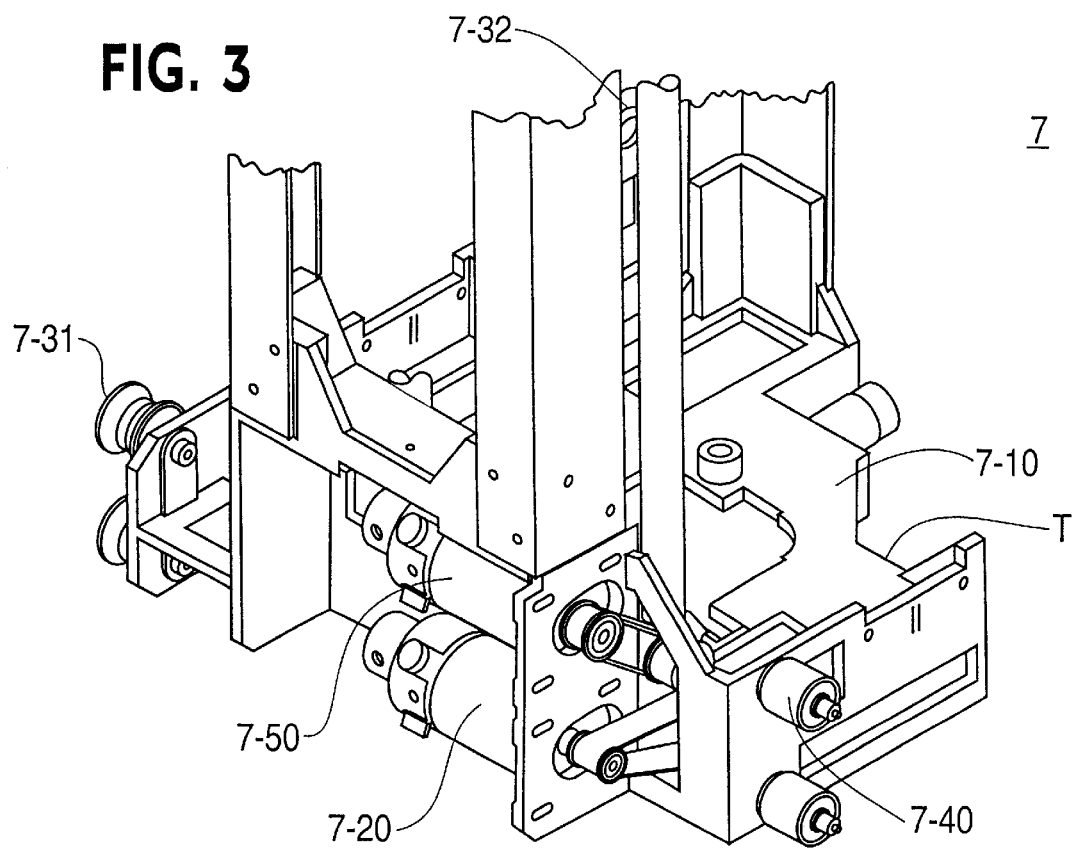
FIG. 3 is an enlarged fragmentary perspective view of an accessor device according to the present invention.

FIG. 3 shows the installed components of the accessor 7 in the housing 5.

The accessor 7 has an accessor base 7-10 as a main component on which other parts thereof are mounted. The accessor 7 comprises a motor 7-20 as an actuating mechanism for actuating gears for the accessor 7 to move in the tape library 1, rollers 7-31, 7-32, 7-40 movable on and along the guide rails 9 when the accessor 7 moves in the tape library 1, and a motor 7-50 as a lifting and lowering mechanism for operating the hand mechanism 4 that is fixed to a belt.

In FIG. 2, the accessor 8 disposed in the housing 6 is identical in structure and installation to the accessor 7 disposed in the housing 5.

FIG. 4 shows the accessors 7, 8 disposed respectively in the housings 5, 6 and also shows the accessor bases 7-10, 8-10 installed in position. The accessors 7, 8 are shown as being kept in retracted areas in the respective housings 5, 6 when they are stopped, with their positional relationship to accessible endmost cells being also shown.

The accessor base 7-10 disposed in the housing 5 is substantially of a triangular shape including a staggered edge (overlapping edge) T defined as a crank shape as if cut from a rectangular shape. The accessor base 7-10 is installed such that the staggered edge T is oriented inwardly of the tape library 1.

The motor 7-20 and the motor 7-50 are mounted on the accessor base 7-10 at a side thereof remote from the staggered edge T so as to face outwardly of the tape library 1. No parts are mounted on the portion of the accessor base 7-10 which is positioned inwardly of the tape library 1.

The rollers 7-31, 7-32 for guiding the accessor 7 for movement in the tape library 1 are disposed as a series of two rollers on a side of the accessor base 7-10 and spaced from each other by a pitch c large enough to minimize any falling of the accessor 7. The rollers 7-31, 7-32 are rollingly mounted on one of the guide rails 9.

The roller 7-40 is disposed on a side of the accessor base 7-10 in opposite relation to the roller 731, and is rollingly mounted on the other guide rail 9.

The accessor base 8-10 of the accessor 8 disposed in the housing 6 is identical in structure to and held in a point symmetrical relationship to the accessor base 7-10 of the accessor 7 disposed in the housing 5. The accessor base 8-10 is substantially of a triangular shape including a staggered edge (overlapping edge) T defined as a crank shape as if cut from a rectangular shape. The rollers 8-31, 8-32.for guiding the accessor 8 for movement in the tape library 1 are disposed as a series of two rollers on a side of the accessor base 8-10, and rollingly mounted on the guide rail 9 on which the roller 7-40 of the accessor 7 is mounted. The rollers 8-31, 8-32 are spaced from each other by a pitch d large enough to minimize any falling of the accessor 8, as with the accessor 7. The roller 8-40 of the accessor 8 is positioned in opposite relation to the roller 8-31, and rollingly mounted on the guide rail 9 on which the rollers 7-31, 7-32 of the accessor 7 are mounted.

When the accessors 7, 8 move toward each other, the staggered edges T of the accessor bases 7-10, 8-10 are brought into overlapping engagement with each other, and the rollers 7-31, 7-32 and the roller 8-40 are associated with each other, and the roller 7-40 and the rollers 8-31, 8-32 are associated with each other. When overlapped or mated, the accessor bases 7-10, 8-10, each of a triangular shape, jointly make up a rectangular shape.

The endmost cell 2-1 in the housing 5 that can be accessed is located in such a position that when the accessor 7 in the housing 5 is retracted, the accessor 8 in the housing 6 can access the endmost cell 2-1.

Similarly, the endmost cell 2-2 in the housing 6 that can be accessed is located in such a position that hen the accessor 8 in the housing 6 is retracted, the accessor 7 in the housing 5 can access the endmost cell 2-2.

Operation of the accessors 7, 8 will be described below with reference to FIG. 4.

In response to a signal supplied from an external device (not shown), the two accessors 7, 8 are movable bidirectionally in the joined housings 5, 6 of the tape library 1 to access designated cells 2 and the drives 3.

In order to avoid a collision with each other, the two accessors 7, 8 are controlled such that each of the accessors 7, 8 does not access cells 2 or the drives 3 beyond the other accessor device.

For example, the cell 2-1 disposed in the housing 5 is usually accessed by the accessor 7 in the housing 5, and the accessor 8 in the housing 6 moves to a cell 2 positioned short of the cell 2-1 without colliding with the accessor 7.

The two accessors 7, 8 are also controlled such that when one of the accessors 7, 8 in the respective housings 5, 6 fails to access the cells 2 and the drives 3 due to trouble, the other accessor device can access all the cells 2 or the drives 3 in the tape library 1.

An example of operation in which the accessor 8 in the housing 6 fails to access the cells 2 and the drives 3 due to trouble will be described below.

After the trouble has occurred, the accessor 8 in the housing 6 moves to a retracted area in the housing 6 and stops its operation.

The non-illustrated external device issues a command to access the cell 2-2 in the housing 6. Since the accessor 8 in the housing 6 fails to operate, the accessor 7 in the housing 5 moves a distance e (see FIG. 4), accesses the cell 2-2, and completes its operation.

At this time, the staggered edges T of the accessor bases 7-10, 8-10 are brought into overlapping engagement with each other in a direction normal to the longitudinal direction of the guide rails 9, and the rollers 7-31, 7-32 and the roller 8-40 are associated with each other, and the roller 7-40 and the rollers 8-31, 8-32 are associated with each other. The accessors 7, 8 now have an overlapping region f (see FIG. 4).

Therefore, the accessor 7 can move closely to the accessor 8, and can access the endmost cell 2-2 in the tape library 1.

Conversely, when the accessor 7 in the housing 5 suffers trouble, the accessor 8 in the housing 6 operates in the same manner as described above. The staggered edges T of the accessor bases 8-10, 7-10 are brought into overlapping engagement with each other, creating an overlapping region therebetween, so that the accessor 8 can access the other endmost cell 2-1 in the tape library 1.

The shapes, dimensions etc. of the components described above in the illustrated embodiment are given by way of example only, and should not be interpreted as restrictive. The shapes, dimensions, etc. of the components may be modified according to design demands, etc.

While a preferred embodiment of the present invention has been described using specific terms, such description is for illustrative purposes only, and it is to be understood that changes and variations may be made without departing from the spirit or scope of the following claims.

What is claimed is:

1. An accessor system for accessing tapes stored in a tape library comprising vertically arranged rows of cells housing storage media, the accessor system comprising:
   a pair of parallel guide rails arranged adjacent to and parallel to a base of said rows of cells; and
   first and second accessors mounted for independent movement along said guide rails, each of said first and second accessors comprising:
   a base;
   guide rail engaging rollers supporting said base, including first and second rollers engaging one of said rails and supporting a side of said base including a forwardmost edge portion of said base, and a third roller engaging an opposite of said rails;
   a motor for driving the third roller of said base;
   a support extending vertically from said base; and
   a hand mechanism moveable by motive means vertically along said support to access said media stored in said cells;
   confronting edge faces of the bases of said first and second accessors having non-linear complementary structures allowing said forwardmost edge portions of each confronting face to travel beyond each other when the accessors are moved toward each other.

2. The accessor system as claimed in claim 1 wherein each of said bases is substantially of a triangular shape, having a first side extending along said guide rails, a second side having an end joined to a rearward end of said first side substantially perpendicularly to said first side, and a third side interconnecting other ends of said first and second sides, said confronting edge faces comprising said third sides.

3. An accessor system as claimed in claim 2 wherein said first and second rollers are mounted under said first side of said base at opposite ends thereof, and said third roller is mounted at a junction of said second side and said third side.

4. An accessor system as claimed in claim 2 wherein said third side of each of said accessor bases is of a crank shape.

5. An accessor system as claimed in claim 1 wherein said motive means comprises a lifting and lowering means for lifting and lowering the hand mechanism of said base.

\* \* \* \* \*